(12) United States Patent
Kogetsu et al.

(10) Patent No.: US 7,919,205 B2
(45) Date of Patent: Apr. 5, 2011

(54) NEGATIVE ELECTRODE FOR LITHIUM ION SECONDARY BATTERY, PRODUCTION METHOD THEREOF AND LITHIUM ION SECONDARY BATTERY COMPRISING THE SAME

(75) Inventors: Yasutaka Kogetsu, Suita (JP); Kazuyoshi Honda, Takatsuki (JP); Toshitada Sato, Osaka (JP); Hiroshi Yoshizawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 1524 days.

(21) Appl. No.: 11/266,299

(22) Filed: Nov. 4, 2005

(65) Prior Publication Data

US 2006/0099507 A1 May 11, 2006

(30) Foreign Application Priority Data

Nov. 11, 2004 (JP) ................................. 2004-328064

(51) Int. Cl.
*H01M 4/00* (2006.01)
(52) U.S. Cl. ....................... 429/128; 429/209; 429/218.1
(58) Field of Classification Search ................... 429/128
See application file for complete search history.

(56) References Cited

U.S. PATENT DOCUMENTS

| 2005/0048369 A1* | 3/2005 | Koshina et al. ............. 429/218.1 |
| 2005/0118504 A1* | 6/2005 | Honda et al. ................ 429/218.1 |
| 2006/0083987 A1* | 4/2006 | Konishiike et al. ......... 429/218.1 |

FOREIGN PATENT DOCUMENTS

| CN | 1763993 | 4/2006 |
| JP | 06-325756 | 11/1994 |
| JP | 2002-083594 | 3/2002 |
| JP | 2002-358954 | 12/2002 |
| JP | 2004-047404 | 2/2004 |

OTHER PUBLICATIONS

Office Action dated Dec. 29, 2006.

* cited by examiner

*Primary Examiner* — Ula C Ruddock
*Assistant Examiner* — Patricia Davis
(74) *Attorney, Agent, or Firm* — McDermott Will & Emery LLP

(57) ABSTRACT

A negative electrode for a lithium ion secondary battery of the present invention includes a current collector and an active material layer carried on the current collector. The active material layer contains silicon and oxygen. In the thickness direction of the active material layer, an oxygen ratio of the active material is greater at the side of the active material layer in contact with the current collector than at the side of the active material layer not in contact with the current collector. The active material layer contains no binder. By using the negative electrode described above, it is possible to provide a high capacity lithium ion secondary battery having superior high rate charge/discharge characteristics and excellent cycle characteristics.

6 Claims, 6 Drawing Sheets

F I G. 3
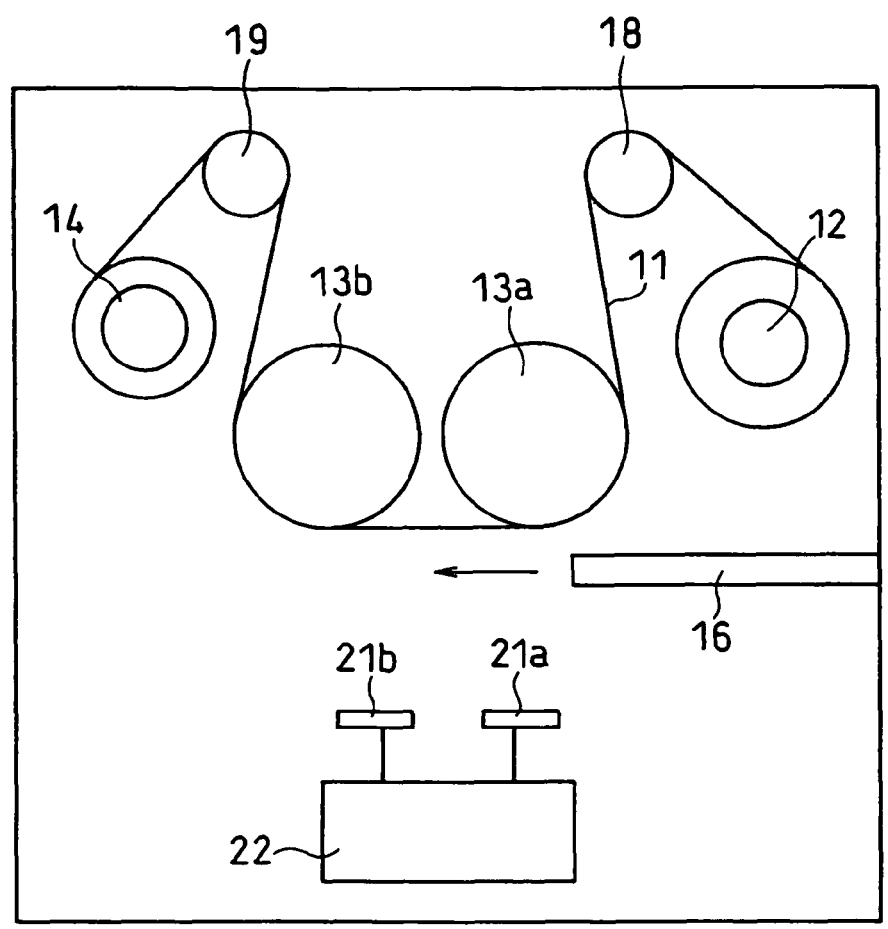

F I G. 4
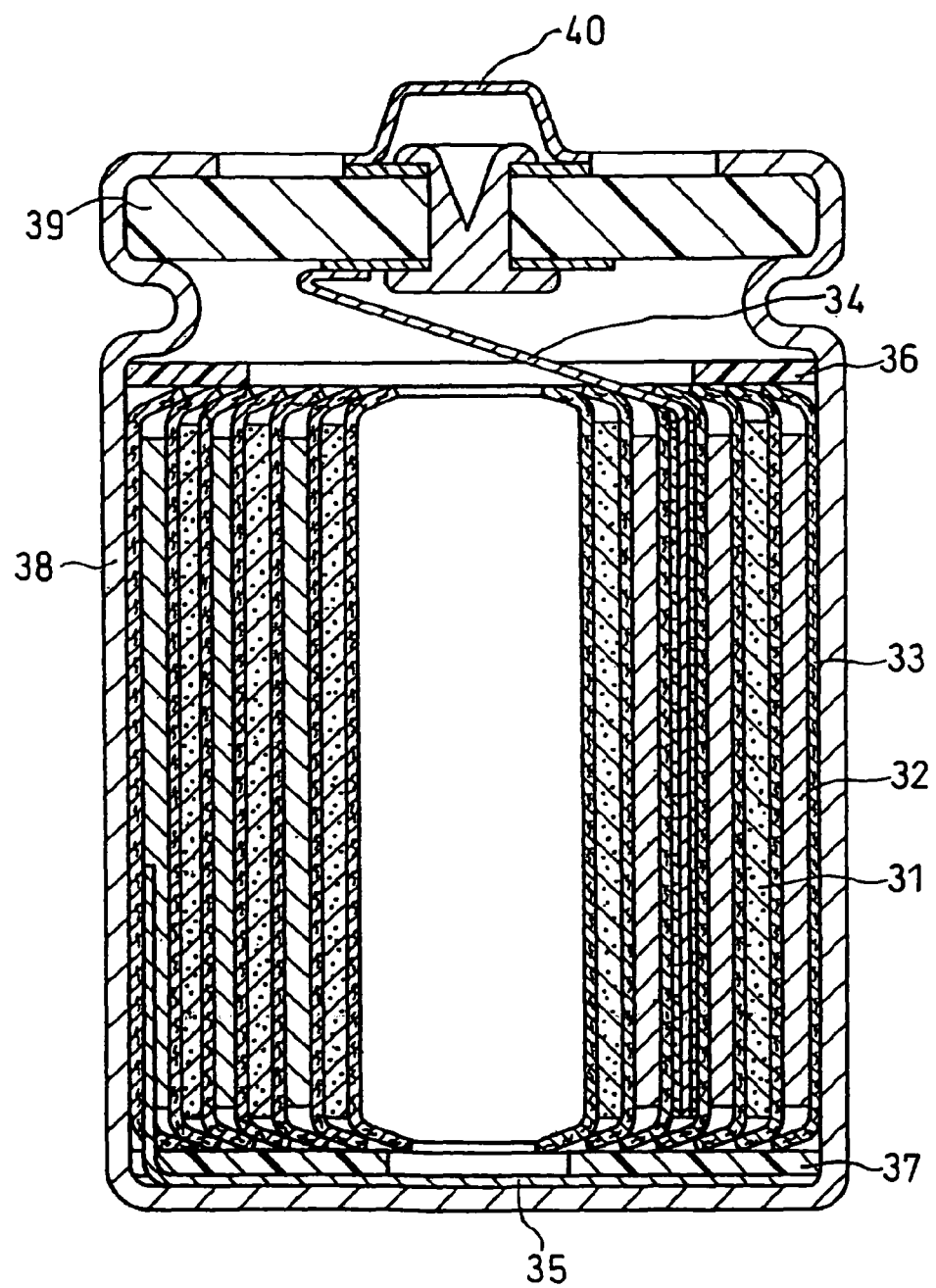

F I G. 7
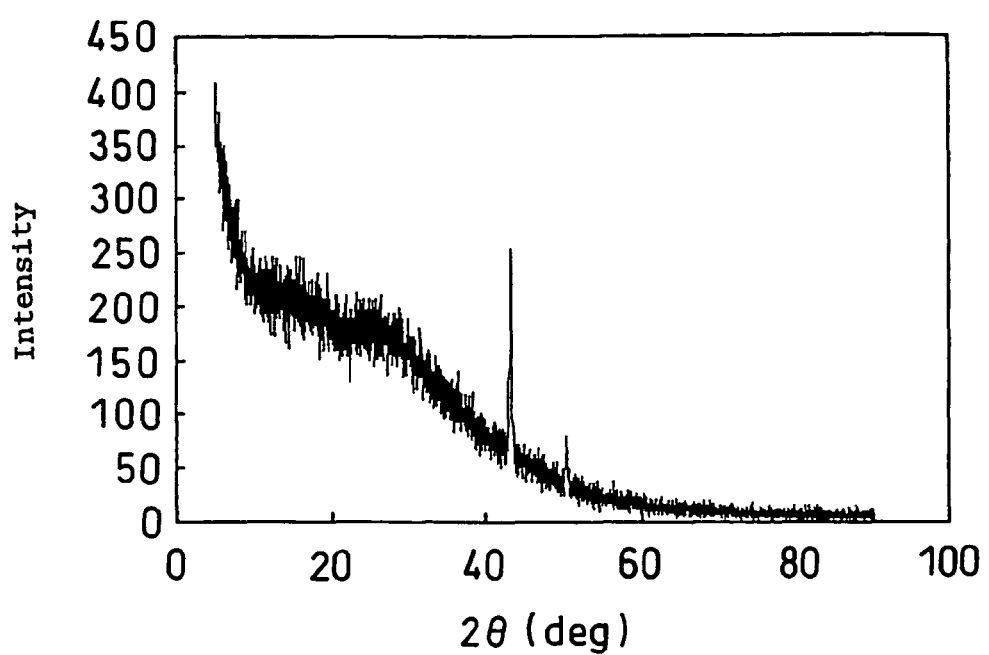

F I G. 8
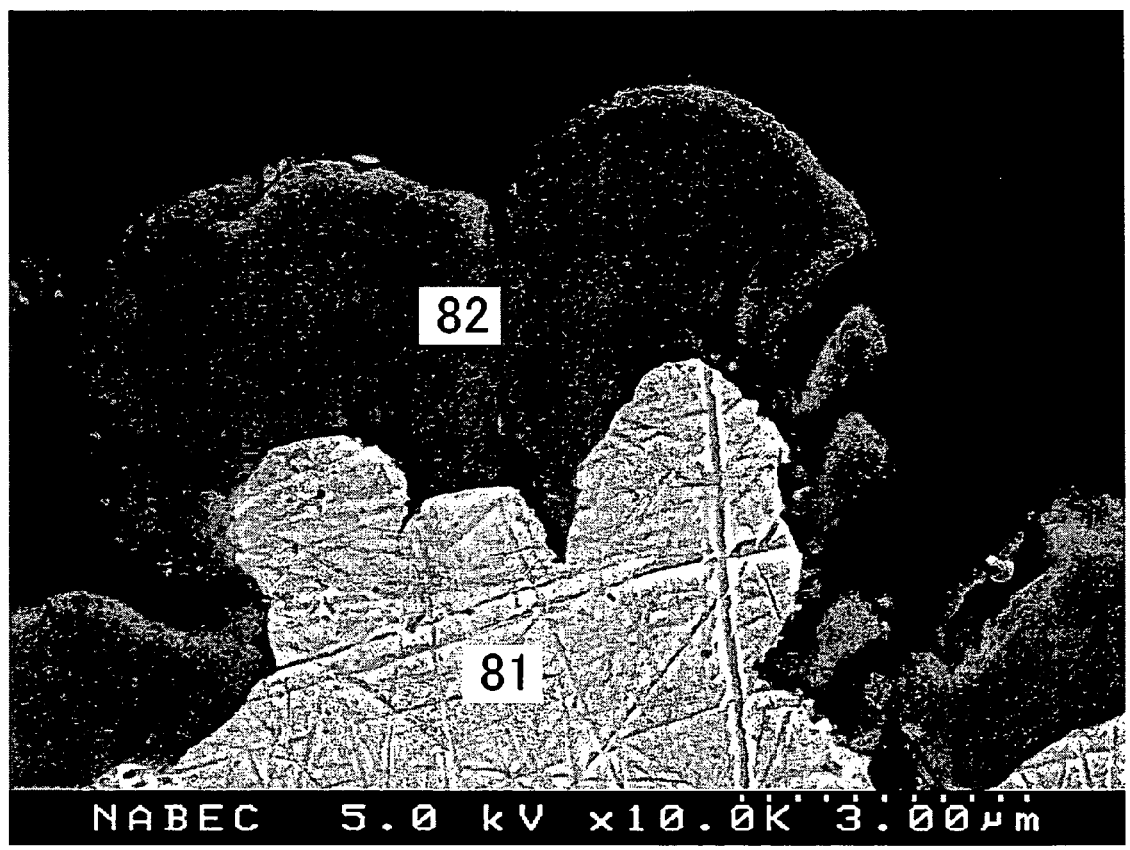

NEGATIVE ELECTRODE FOR LITHIUM ION SECONDARY BATTERY, PRODUCTION METHOD THEREOF AND LITHIUM ION SECONDARY BATTERY COMPRISING THE SAME

FIELD OF THE INVENTION

The present invention relates to a lithium ion secondary battery, and more particularly to a negative electrode therefor and a method for producing the negative electrode.

BACKGROUND OF THE INVENTION

Attention has been given to lithium ion secondary batteries as a power source for driving electronic equipment. Negative electrodes for lithium ion secondary batteries comprising a graphite material have an average potential during the desorption of lithium ions of about 0.2 V (vs. Li/Li$^+$) and exhibit a relatively flat potential. This potential is lower than that of negative electrodes comprising hard carbon, and therefore equipment that requires high voltage and voltage flatness currently employs, as the power source, lithium ion secondary batteries comprising negative electrodes including a graphite material. Graphite materials, however, have a small capacity per unit weight of 372 mAh/g, and a further increase in capacity cannot be expected.

Meanwhile, materials capable of forming an intermetallic compound with lithium are considered promising as negative electrode materials which provide a high capacity. Such materials include silicon, tin and oxides thereof. During the desorption of lithium ions, however, the crystal structure of these materials changes so that the volume of the materials increases. In the case of a negative electrode including an active material comprising Si, the negative electrode active material is represented by $Li_{4.4}Si$ in the state where the maximum amount of lithium ions is absorbed. When Si changes into $Li_{4.4}Si$, the volume increases by 4.12 times. In the case of graphite, on the other hand, even if the maximum amount of lithium ions is absorbed, its volume increases only by 1.2 times.

A large volume change of active material results in cracking of active material particles, insufficient contact between active material and current collector, etc, which shortens charge/discharge cycle life. Particularly when cracking of active material particles occurs, the surface area of the active material particles increases, and the reaction between the active material particles and a non-aqueous electrolyte is accelerated. As a result, a film made of decomposed product of the non-aqueous electrolyte is likely to be formed on the surface of the active material. The formation of such film increases the interface resistance between the active material and the non-aqueous electrolyte, which is considered as a major cause for short charge/discharge cycle life.

In order to solve the above problem, for example, attempts have been made to form an amorphous silicon thin-film on a current collector having a rough surface so as to relieve expansion stress as well as to ensure current collecting efficiency (see, e.g., Japanese Laid-Open Patent Publication No. 2002-83594). In order to increase the adhesion strength between a copper current collector and an amorphous silicon thin-film, Japanese Laid-Open Patent Publication No. 2002-83594 proposes a method for forming a silicon-copper composite layer by forming an amorphous silicon thin-film on the current collector, followed by heat treatment.

In order to prevent an active material from cracking, for example, Japanese Patent Publication No. 2997741 teaches the use of a negative electrode active material composed of $SiO_x$ (0<x<2) having a lower expansion coefficient during charge than silicon.

In order to improve battery capacity and cycle characteristics, for example, Japanese Laid-Open Patent Publication No. 2004-047404 teaches the use of a negative electrode active material composed of a conductive silicon composite made of silicon oxide particles, in which silicon microcrystallites are dispersed, covered with a carbon having high conductivity such as graphite.

In order to enhance charge/discharge efficiency, for example, Japanese Patent Publication No. 3520921 teaches a negative electrode having a multilayered structure composed of a carbon layer and a silicon oxide thin-film layer.

However, the above-mentioned prior art references suffer from various problems. For example, the present inventors examined the negative electrode disclosed by Japanese Laid-Open Patent Publication No. 2002-83594 only to find that lithium ion conductivity in the silicon was low, and that polarization increased when high rate charge/discharge was performed and thus the discharge capacity decreased. In a silicon thin film, in particular, a large concentration gradient of lithium is produced in the thickness direction, and the capacity easily decreases. Further, because silicon has an extremely large expansion coefficient, an electrode composed of silicon is highly deformed so that the electrode group is buckled, degrading the battery's characteristics and safety. The term "buckle" used herein is understood to include the following phenomenon: (i) in the case of a spirally-wound electrode group having a circular cross section, the electrode group inwardly curves toward the center thereof due to the expansion of the electrode(s); and (ii) in the case of a spirally-wound electrode group having a rectangular cross section, the electrode group is partially corrugated.

Moreover, the production of the negative electrode disclosed by Japanese Laid-Open Patent Publication No. 2002-83594 involves considerable costs because, in order to relieve the expansion stress at the interface between silicon and current collector, it requires the steps of forming the silicon into a columnar structure as well as performing heat treatment for diffusing copper in the silicon.

As for the negative electrode disclosed by Japanese Patent Publication No. 2997741, because the active material layer is composed of a single-phase $SiO_x$, the conductivity thereof is low. The addition of a conductive material such as carbon to the active material layer is thus required, and therefore the capacity density decreases. Also, because the irreversible capacity is large, some of the lithium ions transferred from the positive electrode to the negative electrode during the initial charge are captured in the negative electrode so that they cannot participate in the charge/discharge reaction. Accordingly, the battery capacity decreases significantly.

Summing up, the negative electrode of Japanese Patent Publication No. 2997741 fails to take advantage of the characteristics of high-capacity silicon and to provide a capacity as expected.

A further problem arises when the negative electrode contains graphite as a conductive material: an electrolyte containing propylene carbonate cannot be used, because a film made of decomposed product of propylene carbonate is formed on the surface of the active material.

As for the negative electrode disclosed by Japanese Laid-Open Patent Publication No. 2004-047404, because $SiO_x$ is heat-treated to prepare silicon microcrystallites, it is difficult to control the size of the microcrystallites. In this case, since silicon crystals are inherently produced, it is impossible to form amorphous silicon which is advantageous for absorption and desorption of Li. Besides, such microcrystallites might crack during the expansion if the microcrystallites grow larger than a certain size. Also, because the silicon oxide is covered with graphite, an electrolyte containing propylene carbonate cannot be used as is the case in Japanese Patent Publication No. 2997741.

Moreover, the negative electrodes disclosed by Japanese Patent Publication No. 2997741 and Japanese Laid-Open Patent Publication No. 2004-047404 are produced by mixing the negative electrode active material, a conventional conductive material and a conventional binder to form a mixture which is then applied to a metal foil current collector. In this case, because the active material particles and the current collector are bonded by the binder, the following problem arises: due to the large volume change of the active material during charge/discharge cycles as stated earlier, the conductive material and the binder cannot adjust to the volume change so that during repeated charge/discharge cycles, the contact between the active material and the conductive material as well as that between the active material and the binder cannot be maintained. As a result, the contact between the active material and the current collector is weakened, and the polarization increases, decreasing the charge/discharge capacity.

The negative electrode disclosed by Japanese Patent Publication No. 3520921 contains a silicon oxide in which the oxygen ratio x is set to $0 < x \leq 2$. In a thin film layer made of the silicon oxide, the oxygen ratio x is the same in any portion of the layer. When the silicon oxide has a high oxygen ratio, although the expansion coefficient is small during charge and the excellent lithium ion conductivity is obtained, the charge/discharge capacity is small. Conversely, when the silicon oxide has a low oxygen ratio, although the charge/discharge capacity is large, the expansion coefficient during charge is large, and the lithium ion conductivity is low. Moreover, because the silicon oxide thin-film layer is in contact with a carbon layer, the carbon layer and the silicon oxide thin-film layer are separated from each other due to expansion stress during charge, resulting in low current collecting efficiency.

Further, since the production of the carbon layer and the silicon oxide layer requires a completely different production process, the costs for producing negative electrodes will be very high, and negative electrodes cannot be produced efficiently.

BRIEF SUMMARY OF THE INVENTION

The present invention relates to a negative electrode for a lithium ion secondary battery comprising a current collector and an active material layer carried on the current collector, wherein the active material layer comprises silicon, oxygen and no binder, and wherein the active material layer has a larger oxygen ratio on a side which is in contact with the current collector than on a side which is not in contact with the current collector.

The negative electrode active material layer included in the negative electrode for a lithium ion secondary battery of the present invention may be in the form of a sheet. The negative electrode active material layer may have a roughened surface. FIG. 8 shows a negative electrode whose active material layer has a roughened surface. In the negative electrode of FIG. 8, the surface of a current collector 81 is roughened in order to prevent an active material layer 82 from separating from the current collector 81. In this case, the surface of the active material layer 82 is roughened, and accordingly is not flat.

In the negative electrode for a lithium ion secondary battery of the present invention, a plurality of columnar negative electrode active material layers may be formed on the current collector. The columnar active material layers may be formed such that they project in a direction vertical to an average surface of the current collector. Alternatively, the columnar active material layers may be formed such that they project from the average surface at a certain angle. The columnar active material layers may be in contact with each other. The average surface of the current collector as used herein refers to a plane assuming that the roughened surface of the current collector is flat.

When a surface of the active material layer which is not in contact with the current collector contacts air, an oxide film is formed on that surface. In some cases, that surface might have a larger oxygen ratio. In the present invention, however, such an oxide film does not affect the effect of the present invention.

In the above-described negative electrode for a lithium ion secondary battery, it is preferred that the oxygen ratio be continuously increased in the thickness direction from the side which is not in contact with the current collector than the side which is in contact with the current collector.

In the above-described negative electrode for a lithium ion secondary battery, it is preferred that, when the active material layer contains an active material represented by $SiO_x$ ($0 \leq x \leq 2$) and has a thickness of T, an area in the active material layer comprising $SiO_x$ ($0.8 \leq x \leq 2$) have a thickness T1 of not less than T/10.

In the above-described negative electrode for a lithium ion secondary battery, it is preferred that, when the active material layer contains an active material represented by $SiO_x$ ($0 \leq x \leq 2$) and has a thickness of T, an area in the active material layer comprising $SiO_x$ ($0 \leq x \leq 0.8$) have a thickness T2 of not less than T/10.

In the above-described negative electrode for a lithium ion secondary battery, the thickness T of the active material layer is preferably $0.5 \ \mu m \leq T \leq 30 \ \mu m$.

In the above-described negative electrode for a lithium ion secondary battery, an active material contained in the active material layer preferably comprises silicon and a silicon oxide. Preferably, the silicon and the silicon oxide are amorphous and exhibit a broad peak at 10° to 40° in an X-ray diffraction pattern using CuKα radiation as a light source.

The present invention further relates to a method for producing a negative electrode for a lithium ion secondary battery. The method comprises a step of supplying silicon atoms to a current collector by sputtering or vapor deposition through an oxygen atmosphere whose oxygen concentration is controlled to be higher at the inlet side than at the outlet side of a deposition zone while moving the current collector through the deposition zone from the inlet side to the outlet side, to form an active material layer comprising silicon and oxygen on the current collector. As used herein the term "deposition zone" means the area where silicon and oxygen atoms are deposited.

In the above-described method for producing a negative electrode for a lithium ion secondary battery, the oxygen concentration of the oxygen atmosphere is continuously decreased along a direction in which the current collector is moved.

The present invention further relates to a method for producing a negative electrode for a lithium ion secondary battery. The method comprises a step of supplying silicon atoms and oxygen atoms to a current collector from a silicon target and a silicon oxide target by sputtering or vapor deposition while moving the current collector through a deposition zone in a certain direction, to form an active material layer comprising silicon and oxygen on the current collector, wherein the silicon oxide target and the silicon target are arranged in this order along a direction in which the current collector is moved.

In the above-described method for producing a negative electrode for a lithium ion secondary battery, the current collector is preferably heated to 300° C. to 800° C.

In the above-described method for producing a negative electrode for a lithium ion secondary battery, the oxygen contained in the oxygen atmosphere is preferably converted to plasma.

The present invention further relates to a lithium ion secondary battery comprising the above-described negative electrode, a positive electrode, a separator interposed between the positive electrode and the negative electrode, and an electrolyte.

While the novel features of the invention are set forth particularly in the appended claims, the invention, both as to organization and ratio, will be better understood and appreciated, along with other objects and features thereof, from the following detailed description taken in conjunction with the drawings.

BRIEF DESCRIPTION OF THE SEVERAL VIEWS OF THE DRAWING

FIG. 3 is a schematic diagram showing the structure of sputtering equipment used for producing a negative electrode for a lithium ion secondary battery according to one embodiment of the present invention.

FIG. 4 is a schematic vertical sectional view of a cylindrical battery produced in EXAMPLEs.

FIG. 7 is an X-ray diffraction chart of a negative electrode for a lithium ion secondary battery according to one embodiment of the present invention.

FIG. 8 is an electron microscope image of a vertical cross section of a negative electrode for a lithium ion secondary battery according to another embodiment of the present invention.

DETAILED DESCRIPTION OF THE INVENTION

The present invention is based on the finding that, in a negative electrode comprising a current collector and an active material layer containing silicon and oxygen carried on the current collector, the following two advantages are obtained by increasing the oxygen ratio from a side of the active material layer not in contact with the current collector towards a side of the active material layer in contact with the current collector. One of the advantages is improved high rate charge/discharge characteristics. The other advantage is that the expansion coefficient of the active material near the current collector is small so that the stress is relieved, whereby improved cycle characteristics is obtained.

Figure 1:
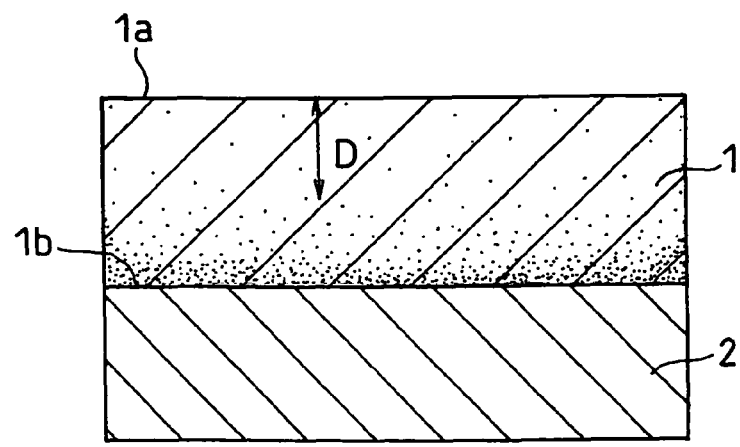
FIG. 1 is a schematic vertical sectional view of a negative electrode for a lithium ion secondary battery according to one embodiment of the present invention.

FIG. 1 is a schematic vertical sectional view of a negative electrode according to one embodiment of the present invention.

The negative electrode of FIG. 1 includes a current collector 2 having a flat surface and an active material layer 1 carried on the current collector 2. This active material layer contains no binder.

The active material layer 1 is composed of oxygen and silicon. The active material layer may be composed of silicon and a silicon oxide, or only a silicon oxide. The silicon and the silicon oxide both function as the active material.

In the active material layer, silicon and oxygen are not uniformly distributed. The active material layer may partially comprise Si or $SiO_2$.

The active material layer may further contain an element other than silicon and oxygen such as carbon (C) or nitrogen (N).

The current collector may be made of a material such as copper, nickel or stainless steel.

In the active material layer of the negative electrode shown in FIG. 1, as described previously, the ratio of oxygen to silicon is increased from the surface 1a of the active material layer 1 which is not in contact with the current collector 2 towards the surface 1b of the active material layer 1 which is in contact with the current collector. In other words, if the depth from the surface 1a to the surface 1b is taken as D, as the D increases (i.e., as it gets further away from the surface 1a towards the surface 1b), the ratio of oxygen to silicon is increased. For example, when an active material contained in the active material layer containing silicon and oxygen is represented by $SiO_x$ ($0 \leq x \leq 2$), the molar ratio x of oxygen to silicon (hereinafter also referred to as "oxygen ratio") is larger on the side of the active material layer which is in contact with the current collector than on the side of the same which is not in contact with the current collector.

Because the mobility of lithium ions increases in an area where the molar ratio x of oxygen in the active material layer is large, the mobility of lithium ions increases from the surface 1a towards the surface 1b. In the present invention, because the amount of oxygen is changed in the thickness direction of the active material layer, when lithium ions enter from the surface 1a and diffuse in the active material layer, the concentration of lithium will be almost the same in the entire area of the active material layer. This prevents a lithium concentration gradient from occurring in the thickness direction. For this reason, even during high rate charge/discharge, charge/discharge reaction can proceed uniformly in the entire area of the active material layer, which means a high battery capacity can be obtained even during high rate charge/discharge.

The reason why the mobility of lithium ions increases is not well understood, but could be explained as follows. Specifically, the silicon oxide has, inside thereof, a large number of paths in which lithium ions can migrate. As the ratio of oxygen increases, the reaction with lithium decreases, which makes it difficult to produce $Li_ySi$ that hampers the migration of lithium ions. In the present invention, because the amount of produced $Li_ySi$ is small, the mobility of lithium ions increases.

The present inventors found that, when the active material contained in the active material layer is represented by $SiO_x$, there is the following relationship between the molar ratio x of oxygen to silicon and various characteristics. Specifically, as the molar ratio x becomes smaller, the active material has a larger capacity, but the lithium ion conductivity decreases and the expansion coefficient of the active material during the reaction with lithium increases. Conversely, as the molar ratio x becomes larger, the lithium ion conductivity increases and the expansion coefficient of the active material during the reaction with lithium decreases, but the capacity of the active material decreases.

In short, the silicon oxide has a smaller expansion coefficient as the molar ratio x of oxygen is increased. The silicon oxide thus does not change in its structure during charge. For this reason, it is presumed that the reaction speed between the silicon oxide and lithium ions is accelerated.

Moreover, in the active material layer, because the molar ratio x of oxygen is increased from the surface 1a towards the surface 1b, the expansion coefficient of the active material present near the surface 1b is small during charge: in other words, it has a small expansion coefficient. When the active material has a small expansion coefficient, the stress that occurs at the interface between the current collector and the active material is relieved, preventing the separation of the active material from the current collector, thus improving the current collecting efficiency. Thereby, it is possible to improve the cycle characteristics of the battery.

In the negative electrode of the present invention, it is preferred that the oxygen ratio be continuously increased in the thickness direction from the side of the active material layer not in contact with the current collector towards the side of the same in contact with the current collector. Thereby, it is possible to further improve the above effects.

It is also preferred that, when the thickness of the entire active material layer is taken as T, an area comprising $SiO_x$ ($0 \leq x \leq 0.8$) which is present near the surface 1a of the active material have a thickness T2 of not less than T/10 (T/10≦T2). Even if the $SiO_x$ present near the surface 1a has a composition having a low molar ratio x of oxygen, it does not affect high rate charge/discharge characteristics. This is because the diffusion distance of lithium is short and it is possible to maintain the speed at which lithium is sufficiently supplied. In contrast, when the thickness T2 of the area which is near the surface 1a is smaller than 1/10 of the active material thickness T, or when the oxygen ratio x is larger than 0.8, because the battery capacity decreases, the characteristics of high capacity silicon cannot be fully utilized.

The thickness T2 is preferably not greater than 9/10 of the active material layer thickness T. This is because a thickness T2 of greater than 9/10 of the active material layer thickness T decreases lithium ion conductivity, decreasing high rate discharge capacity.

Preferably, an area near the interface between the active material layer and the current collector (i.e., the side of the active material layer in contact with the current collector) comprises an active material ($SiO_x$) with a molar ratio x of oxygen of $0.8 \leq x \leq 2$. The area preferably has a thickness T1 of not less than T/10 (T/10≦T1). When the molar ratio x is less than 0.8, or when the molar ratio x is not less than 0.8 and the thickness T1 is smaller than 1/10 of the active material layer thickness T, the lithium ion conductivity decreases, resulting in a low high rate charge/discharge capacity.

The thickness T1 is preferably not greater than 9/10 of the active material layer thickness T. This is because as the molar ratio x of oxygen is increased, the charge/discharge capacity of the active material decreases. Accordingly, the thickness T1 of greater than 9/10 of the active material layer thickness T leads to decreased battery capacity.

Moreover, when the area containing an active material ($SiO_x$) where $0 \leq x \leq 0.8$ has a thickness T1 of not less than T/10 (T/10≦T1) and the area containing an active material ($SiO_x$) where $0.8 \leq x \leq 2$ has a thickness T2 of not less than T/10 (T/10≦T2), it is preferred that the ratio ($x_b/x_a$) between the molar ratio $x_a$ of oxygen to silicon at the side of the active material layer not in contact with the current collector and the molar ratio $x_b$ of oxygen to silicon at the side of the active material layer in contact with the current collector be 3 to 20. From the same reason given previously for the relationship between the molar ratio of oxygen and various characteristics, if the ratio ($x_b/x_a$) falls within the above range, higher battery capacity and higher high rate charge/discharge capacity can be obtained.

The active material layer thickness T is preferably 0.5 μm≦T≦30 μm. When the active material layer thickness is smaller than 0.5 μm, satisfactory battery capacity cannot be obtained. When the active material layer thickness is greater than 30 μm, electric resistance in the thickness direction of the active material layer increases, resulting in a low high rate charge/discharge capacity.

Preferably, the silicon and silicon oxide contained in the above-described active material layer are amorphous and exhibit a broad peak with a half width of not less than 0.5° at 2θ=20° to 40° in an X-ray diffraction pattern using Cuκα radiation as a light source. This is because, since crystalline silicon has a low ion conductivity, the high rate charge/discharge capacity becomes small, and also because, since crystalline silicon is easily cracked by expansion, the cycle characteristics of the battery decreases.

The surface of the current collector may be roughened. By roughening the surface of the current collector, the adhesion strength between the active material layer and the current collector can be improved.

As described above, by changing the molar ratio x of oxygen in the thickness direction of the active material layer, compared to an active material layer in which the molar ratio x of oxygen is uniform, high rate charge/discharge characteristics can be improved, and at the same time, a high ion conductivity and a high capacity can be achieved. It is also possible to improve cycle characteristics by reducing stress which occurs at the interface between the active material layer and the current collector due to the expansion of the active material.

The negative electrode for a lithium ion secondary battery of the present invention does not require the use of graphite, and therefore it is possible to use propylene carbonate as a solvent for electrolyte. The use of an electrolyte containing propylene carbonate improves discharge capacity of the battery in a low temperature environment.

A description will be now given of a method for producing a negative electrode for a lithium ion secondary battery of the present invention.

The negative electrode for a lithium ion secondary battery of the present invention can be produced, for example, by a method including a step of supplying silicon atoms to a current collector by sputtering or vapor deposition through an oxygen atmosphere whose oxygen concentration is controlled to be higher at the inlet side than at the outlet side of a deposition zone while moving the current collector through the deposition zone from the inlet side to the outlet side, to form an active material layer comprising silicon and oxygen on the current collector.

Figure 2:
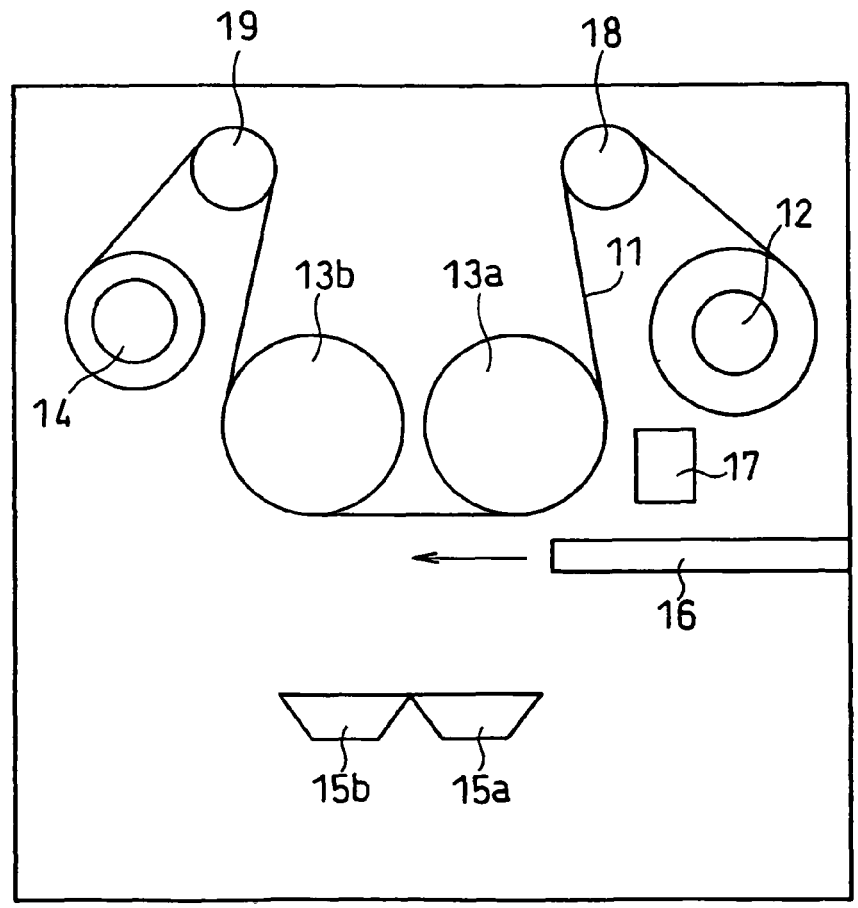
FIG. 2 is a schematic diagram showing the structure of vapor deposition equipment used for producing a negative electrode for a lithium ion secondary battery according to one embodiment of the present invention.

For example, the negative electrode for a lithium ion secondary battery of the present invention can be produced using equipment including a vapor deposition apparatus or equipment including a sputtering apparatus as shown in FIG. 2 or 3.

The vapor deposition equipment of FIG. 2 includes a feeding roller 12 for feeding a current collector, can rollers 13a and 13b, a winding roller 14 and silicon targets 15a and 15b arranged in a vacuum chamber (not shown in the drawing). In the vapor deposition equipment of FIG. 2, a long current collector 11 is fed from the feeding roller 12 through a roller 18, the can rollers 13a and 13b and another roller 19 to the winding roller 14. The targets are heated by an electron beam (EB) heater (not shown in the drawing).

Between the current collector 11 and the silicon targets exists an oxygen atmosphere. For example, silicon atoms are supplied onto the current collector with oxygen atoms by heating the silicon targets to allow the silicon atoms to pass through the oxygen atmosphere. Thereby, an active material containing silicon and oxygen is gradually formed on the current collector 11 while the current collector is passed through the can rollers 13a and 13b.

As the oxygen atmosphere, for example, oxygen gas can be used. In the equipment of FIG. 2, for example, oxygen gas is ejected from an oxygen nozzle 16 in the direction shown by an arrow (the direction parallel to the moving direction of the current collector). The oxygen nozzle 16 is preferably located close to the position at which the active material layer is first formed on the current collector (i.e., at the starting position of the film formation) such that oxygen gas is ejected in the direction parallel to the moving direction of the current collector as shown in FIG. 2.

In the production of the negative electrode of the present invention, for example, oxygen gas is ejected from the oxygen nozzle 16 towards the moving direction of the current collector 11. While silicon atoms are passing through the oxygen gas, oxygen is consumed, whereby the oxygen concentration in the oxygen atmosphere is changed spacially from the inlet side to the outlet side of the deposition zone. Accordingly, the ratio of oxygen contained in the deposited active material layer can be changed in the thickness direction of the active material layer. At this time, the flow rate of the oxygen gas ejected from the oxygen nozzle 16 is preferably adjusted such that oxygen is consumed by the reaction with the silicon atoms to reduce the oxygen concentration from the inlet side to the outlet side of the deposition zone. Alternatively, the flow rate of the oxygen gas may be adjusted such that an oxygen concentration gradient is produced in the deposition zone, whereby it is possible to adjust the distribution of oxygen in the thickness direction of the active material layer. The flow rate of the oxygen gas is determined based on the volume of vacuum chamber, the suction capability of a pump used to suck a gas in the vacuum chamber, the speed at which the target is evaporated, etc.

The oxygen atmosphere may contain any other gas than oxygen. When the oxygen atmosphere is oxygen gas, for example, the oxygen gas may be a mixed gas containing a small amount of other gas such as nitrogen or argon. In this case, the oxygen concentration can be reduced in the moving direction of the current collector by adjusting the amount of oxygen gas contained in the mixed gas or the flow rate of the mixed gas. The oxygen atmosphere may be air.

Summing up, the active material layer containing oxygen and silicon starts to be deposited at the position where the current collector 11 passes through the can roller 13a (i.e., at the starting position of the film formation). At this time, because the oxygen atmosphere present between the starting position of the film formation and the target has a high oxygen concentration, the layer deposited near the starting position of the film formation has a high molar ratio of oxygen to silicon.

At the position at which the current collector finishes passing through the can roller 13b (i.e., the ending position of the film formation), although the active material layer is thick, because the oxygen concentration is reduced from the starting position to the ending position of the film formation, in the active material layer, the molar ratio x of oxygen to silicon is decreased. In other words, the further away from the current collector, the lower the molar ratio of x.

In the manner as described above, the molar ratio of oxygen can be made higher at the side of the active material layer in contact with the current collector than at the side of the same not in contact with the current collector. Also, the oxygen molar ratio in the active material layer can be continuously changed in the thickness direction when oxygen concentration is decreased continuously from the inlet side to the outlet side of the deposition zone.

In the case where the vapor deposition equipment includes an electron beam heater, the flow rate of the oxygen gas is preferably adjusted such that the oxygen pressure in the vacuum chamber is $5 \times 10^{-4}$ Torr or less because if the oxygen pressure in the vacuum chamber is high, the electron beam heater might discharge electricity.

The can roller 13a through which the current collector passes at the beginning of the film formation may be heated to 300° C. to 800° C. Because the current collector 11 is also heated by contacting the heated can roller 13, the reaction between silicon and oxygen occurs easily on the current collector. This enhances the rate of the film formation.

A means 17 for converting oxygen to plasma may be arranged near the oxygen nozzle 16 as shown in FIG. 2. Thereby, oxygen can be converted to plasma to accelerate the reaction between silicon and oxygen, increasing the rate of the film formation. An example of the means 17 for converting oxygen to plasma is an electron beam irradiation device.

The thickness of the active material layer can be changed by changing the moving speed of the current collector.

The length of the deposition zone (e.g., the distance between the starting position of the film formation and the ending position of the film formation) can be appropriately determined, for example, based on the thickness of the active material layer formed, the moving speed of the current collector, the speed at which the active material layer is formed, etc.

The negative electrode for a lithium ion secondary battery of the present invention can be produced also by evaporating two different targets simultaneously. Specifically, the target 15a may be a silicon oxide such as silicon dioxide, and the target 15b may be silicon. In this case, the silicon oxide target and the silicon target should be arranged such that the silicon oxide target precedes the silicon target in the moving direction of the current collector. In this manner, the ratio of oxygen atoms contained in the atom group moving from the targets to the current collector can be reduced in the moving direction of the current collector. In other words, at the starting position of the film formation, a film having a high oxygen ratio is formed on the current collector. As the current collector is moved towards the ending position of the film formation, the ratio of oxygen atoms contained to the total of silicon atoms and oxygen atoms which are ejected from the targets is decreased. Accordingly, the oxygen ratio becomes lower in the thickness direction of the active material layer (i.e., as it gets further away from the current collector). At this time, it is preferred to adjust the distance between the target 15a and the target 15b and/or the energy to evaporate the targets. Thereby, it is possible to obtain an active material layer having a desired oxygen distribution.

In the production of the negative electrode for a lithium ion secondary battery of the present invention, instead of the vapor deposition equipment, sputtering equipment can also be used.

FIG. 3 is a schematic diagram of sputtering equipment usable in the production of the negative electrode of the present invention. In FIG. 3, the same reference numbers are assigned to the same components illustrated in FIG. 2. Similar to the vapor deposition equipment of FIG. 2, the formation of the active material layer on the current collector is performed in a vacuum chamber (not shown in the drawing).

In the sputtering equipment of FIG. 3, sputtering gas such as argon is converted to plasma by an alternating current power source 22.

Similar to the vapor deposition equipment of FIG. 2, an oxygen atmosphere is present between silicon targets and the current collector. The oxygen concentration is reduced from the starting position of the film formation towards the ending position of the film formation.

Silicon targets 21a and 21b are sputtered by the sputtering gas having been converted to plasma, which allows the evaporated silicon atoms to pass through the oxygen atmosphere so as to supply the silicon atoms to the current collector with oxygen atoms. At this time, the oxygen concentration is decreased from the starting position to the ending position of the film formation (i.e., towards the moving direction of the current collector). Accordingly, in the produced active material layer, the molar ratio of oxygen is increased in the thickness direction of the active material layer from the surface of the negative electrode towards the current collector as in the case of the negative electrode produced using the vapor deposition equipment of FIG. 2.

In the sputtering equipment shown in FIG. 3, the introduced oxygen is also converted to plasma while argon serving as the sputtering gas is converted to plasma by the alternating current power source 22. For this reason, the sputtering equipment shown in FIG. 3 need not have a means for converting oxygen to plasma such as an electron beam irradiation device.

The can roller 13a is preferably heated to 300° C. to 800° C. as in the case of producing the negative electrode using the vapor deposition equipment.

As described previously, the distribution of oxygen in the thickness direction of the active material layer can be changed by adjusting the flow rate of oxygen gas ejected from the oxygen nozzle. The thickness of the active material layer formed on the current collector can be changed by changing the moving speed of the current collector.

Similar to the case of using the vapor deposition equipment, two different targets may be sputtered simultaneously. For example, the target 21a may be a silicon oxide such as silicon dioxide, and the target 21b may be silicon. The silicon oxide target and the silicon target should be arranged such that the silicon oxide target precedes the silicon target in the moving direction of the current collector. In this manner, a negative electrode can be produced having an active material layer in which the molar ratio of oxygen is decreased from the surface of the negative electrode towards the current collector.

Even when the vapor deposition equipment or the sputtering equipment has only a single can roller and a single target, the negative electrode as described above can be produced by adjusting the moving speed of the current collector, the flow rate of oxygen, energy added to the target, etc during the formation of the active material layer.

By the production method described above, it is possible to form, on a current collector, an active material layer in which the molar ratio of oxygen is increased in the thickness direction of the active material layer from the surface of the negative electrode towards the current collector. It is also possible to form an active material layer in which the oxygen ratio is continuously changed. In such active material layer, even if the active material expands during charge, the expansion stress will not concentrate on a certain area. Moreover, because less costly silicon is used as the target and the active material layer can be continuously formed in one vacuum chamber, it is possible to achieve the production method which is low cost and highly efficient.

Hereinafter, the present invention will be described in detail using examples.

Example 1

Battery 1

(i) Production of Positive Electrode

With 100 parts by weight of lithium cobalt oxide ($LiCoO_2$) having an average particle size of 5 μm was mixed 3 parts by weigh of acetylene black as a conductive material to prepare a mixture. The obtained mixture was mixed with a N-methyl-2-pyrrolidone (NMP) solution of polyvinylidene fluoride (PVdF) as a binder such that 4 parts by weight of PVDF was added to the mixture, followed by kneading to prepare a positive electrode material mixture paste. The obtained positive electrode material mixture paste was applied onto both surfaces of a current collector sheet made of an aluminum foil, followed by drying to produce an electrode plate. The electrode plate was rolled to have a predetermined thickness to produce a positive electrode.

(ii) Production of Negative Electrode

The process for producing a negative electrode will be described later below.

(iii) Production of Battery

A 17500-type cylindrical battery as shown in FIG. 4 was produced using the above-produced positive electrode and negative electrode.

The positive electrode 31 and the negative electrode 32 were spirally wound with a separator 33 interposed therebetween to produce an electrode assembly. The electrode assembly was housed in an iron battery case 38 plated with nickel. One end of an aluminum positive electrode lead 34 was connected to the positive electrode 31. The other end of the positive electrode lead 34 was connected to a positive electrode terminal 40, which was attached to a conductive member arranged in the center of a resin sealing plate 39, by connecting the other end of the positive electrode lead 34 to the underside of the conductive member. One end of a nickel negative electrode lead 35 was connected to the negative electrode 32. The other end of the nickel negative electrode lead 35 was connected to the bottom of the battery case 38. On the upper part of the electrode assembly was placed an upper insulating plate 36. On the lower part of the same was placed a lower insulating plate 37.

Subsequently, a predetermined amount of electrolyte was injected into the battery case 38. The electrolyte was prepared by dissolving $LiPF_6$ in a solvent mixture of ethylene carbonate (EC) and ethyl methyl carbonate (EMC) at a volume ratio of 1:3 at a $LiPF_6$ concentration of 1 mol/L.

Finally, the opening of the battery case 38 was sealed with the sealing plate 39 with the edge of the opening crimping onto the periphery of the sealing plate 39. Thereby, a battery was produced.

A process for producing a negative electrode is now described here. In producing a negative electrode, vapor deposition equipment including a vapor deposition apparatus (available from ULVAC, Inc.) having an EB heater (not shown in the drawing), a feeding roller for feeding a current collector, can rollers and a winding roller as shown in FIG. 2 was used.

A negative electrode was produced essentially as described previously.

As the current collector, an electrolytic copper foil (available from Furukawa Circuit Foil Co., Ltd.) having a width of 10 cm, a thickness of 35 µm and a length of 50 m was used.

As the oxygen atmosphere, oxygen gas having a purity of 99.7% (available from Nippon Sanso Corporation) was used. The oxygen gas was ejected from an oxygen nozzle 16 at a flow rate of 80 sccm. The oxygen nozzle 16 was connected to a pipe inserted in a vacuum chamber which connected to an oxygen bomb through a mass flow controller.

As targets 15a and 15b, single silicon crystals having a purity of 99.9999% (available from Shin-Etsu Chemical Co., Ltd.) were used.

The current collector copper foil was fed from a feeding roller 12 through can rollers 13a and 13b to a winding roller 14 having an empty reel where the copper foil was wound. The copper foil was moved at a rate of 30 cm/min. The can rollers 13a and 13b had a temperature of 20° C.

An electron beam was irradiated to the single silicon crystals to allow evaporated silicon atoms to pass through the oxygen atmosphere so as to supply the silicon atoms to the current collector copper foil, whereby an active material layer containing silicon and oxygen was formed on one surface of the current collector. For the formation, the accelerating voltage of the electron beam irradiated to the targets 15a and 15b of single silicon crystals was set at −8 kV. The emission of the electron beam was set at 400 mA.

In the same manner as above, an active material layer containing silicon and oxygen was also formed on the other surface of the current collector. Each active material layer had a thickness of 6.2 µm.

Finally, the thus-produced electrode plate was cut into a certain size to produce a negative electrode. The thus-obtained negative electrode was denoted as negative electrode 1.

Figure 5:
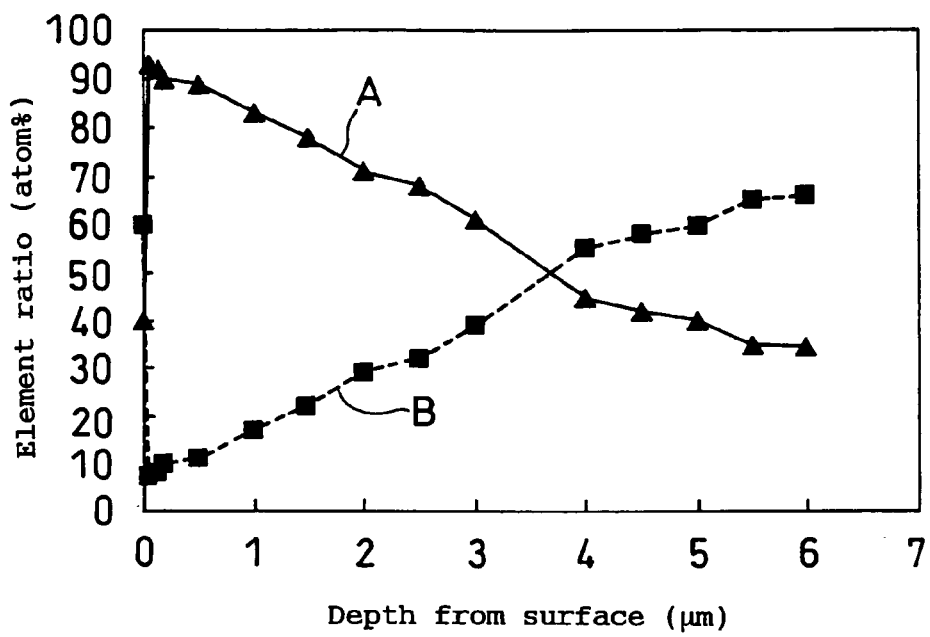
FIG. 5 is a graph of the depth from surface versus silicon content and aluminum content for a negative electrode for a lithium ion secondary battery according to one embodiment of the present invention.

The negative electrode 1 was analyzed by Auger electron spectroscopy (AES). The results are shown in FIG. 5. In FIG. 5, a depth of 0 µm means the surface of the active material layer not in contact with the current collector.

As can be seen from FIG. 5, as the depth increased from the surface of the active material layer not in contact with the current collector, the amount (atom %) of oxygen increased (curve B) and the amount of silicon decreased (curve A).

On the surface of the active material layer not in contact with the current collector, the oxygen ratio was higher. Presumably, this is because when the produced negative electrode was removed from the vacuum chamber, the negative electrode reacted with oxygen in the air to form an oxide film on the surface of the negative electrode.

FIG. 5 also indicates that the oxygen ratio was the lowest at a depth of 0.05 µm (50 nm) from the surface not in contact with the current collector, and that the oxygen ratio continuously increased until a depth of 6 µm.

The negative electrode 1 was analyzed also by X-ray photoelectron spectroscopy (XPS). The results are shown in FIG. 6.

Figure 6:
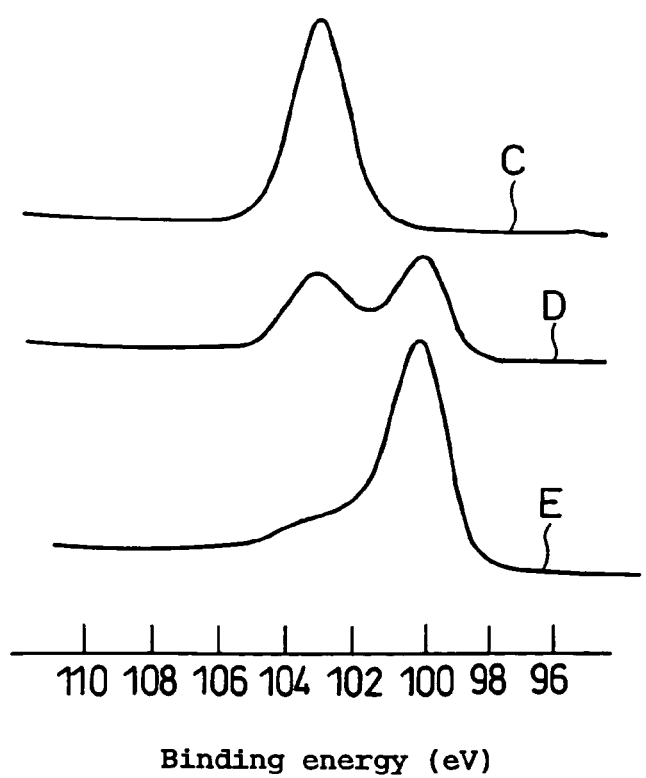
FIG. 6 is a graph showing results obtained when a negative electrode for a lithium ion secondary battery according to one embodiment of the present invention is analyzed by X-ray photoelectron spectroscopy (XPS).

As shown in FIG. 6, a peak of Si was observed at a depth of 50 nm from the surface not in contact with the current collector (curve E). Two peaks of Si and $SiO_x$ (whose x value was presumably a little less than 2) were observed at a depth of 2 µm (curve D). A peak of $SiO_x$ was observed at a depth of 6 µm (curve C). The peak of $SiO_x$ observed at a depth of 6 µm was shifted in some degree to lower binding energy than the peak of $SiO_2$. This is presumably because due to high deposition velocity, perfect $SiO_2$ was not formed and the molar ratio of oxygen to silicon became less than 2.

The negative electrode 1 was analyzed also by X-ray diffractometry (XRD). The results are shown in FIG. 7.

As a result of identification, only copper was detected. In the obtained chart, a broad halo was observed at a 2θ angle of 10° to 35°. This broad halo is considered to show that the active material contained in the active material layer including silicon and oxygen was amorphous.

From the foregoing analysis results, it was confirmed that the active material contained in the active material layer of the negative electrode 1 was amorphous, and that the oxygen ratio increased in the thickness direction of the active material layer from the surface of the negative electrode 1 towards the current collector.

Comparative Battery 1

For comparison, a battery was produced in the same manner as the battery 1 was produced except that, in the production of the negative electrode, without using oxygen, a thin film of silicon was formed on the current collector. The produced battery was denoted as comparative battery 1.

Comparative Example 2

A negative electrode was formed in the same manner as the battery 1 was produced except that an SiO thin film was formed on each surface of the current collector under the following conditions:

target: sintered $SiO_2$ (available from Sumitomo Titanium Corporation);

accelerating voltage of electron beam irradiated to the single silicon crystal: −8 kV; and emission of electron beam: 30 mA.

Using the thus-obtained negative electrode, a battery was produced in the same manner as the battery 1 was produced. The produced battery was denoted as comparative battery 2.

The negative electrode active material layers of the comparative batteries 1 and 2 were also subjected to Auger electron spectroscopy (AES). As a result, it was confirmed that each active material layer had the same composition in any portion of the layer.

(Evaluation Method)

The battery 1 and the comparative batteries 1 and 2 produced above were each charged at a constant current of 40 mA until the battery voltage reached 4.2 V at an ambient temperature of 25° C. After an interval of 20 minutes, the battery was then discharged at a current of 40 mA until the battery voltage decreased to 2.5 V. This charge/discharge cycle was repeated twice. The discharge capacity obtained at the second cycle was denoted as initial capacity. The rate of discharge capacity at the first cycle to the charge capacity at the first cycle expressed in percentage was denoted as charge/discharge efficiency.

High rate capacity ratio was determined as follows.

Each battery was charged at a constant current of 40 mA until the battery voltage reached 4.2 V at an ambient temperature of 25° C. After an interval of 20 minutes, the battery was then discharged at a current of 400 mA until the battery voltage decreased to 2.5 V, during which the discharge capacity was measured. The rate of the obtained discharge capacity to the initial capacity expressed in percentage was denoted as high rate capacity rate.

In order to evaluate cycle characteristics, capacity retention rate was determined.

Each battery was subjected to 100 charge/discharge cycles in each of which charging was performed at a constant current of 40 mA until the battery voltage reached 4.2 V at an ambient temperature of 25° C., after an interval of 20 minutes, discharging was then performed at a current of 40 mA until the battery voltage decreased to 2.5 V. The rate of the discharge capacity obtained at the 100th cycle to the initial capacity expressed in percentage was denoted as capacity retention rate.

The results are shown in Table 1.

TABLE 1

|  | Initial capacity (mAh) | Charge/discharge efficiency (%) | High rate capacity rate (%) | Capacity retention rate at the 100th cycle (%) |
|---|---|---|---|---|
| Battery 1 | 242 | 82 | 95 | 90 |
| Comp. Battery 1 | 273 | 91 | 60 | 55 |
| Comp. Battery 2 | 119 | 40 | 81 | 89 |

As can be seen from Table 1, the battery 1 exhibited relatively high initial capacity and high charge/discharge efficiency as well as excellent high rate capacity ratio and superior capacity retention rate. As for the comparative battery 1, on the other hand, although it exhibited high charge/discharge efficiency and high initial capacity, its high rate capacity ratio and capacity retention rate were much lower than those of the battery 1.

This is presumably because, in the battery 1 in which an area near the interface between the active material layer and the current collector was made of $SiO_x$ having a high oxygen rate, the reaction between silicon and lithium decreased so that the expansion of the active material was suppressed.

The comparative battery 2 was excellent in terms of cycle characteristics because it exhibited high capacity retention rate. However, its initial capacity was small, and its high rate capacity ratio and charge retention rate were also lower than those of the battery 1. In particular, the charge/discharge efficiency was extremely lower than that of the battery 1. This extremely low charge/discharge efficiency was presumably caused by a side reaction where oxygen of SiO bonded to lithium.

In the battery 1, it was found from the results of the XPS analysis that even when the molar ratio of oxygen was changed, the peak indicating SiO did not appear, instead, the heights of the peaks of Si and $SiO_x$ (having a composition close to $SiO_2$) changed. In other words, microscopically, the negative electrode of the battery 1 is presumed to be in a state where Si and $SiO_x$ are mixed. It is presumed that because Si has a high charge/discharge efficiency and $SiO_x$ does not react with silicon, the incorporation of such mixture in the negative electrode improved the charge/discharge efficiency of the battery.

Example 2

In this example, comparisons were made between batteries having a propylene-carbonate (PC)-containing electrolyte and batteries having a non-PC-containing electrolyte in terms of discharge capacity ratio at −10° C., initial capacity and charge/discharge efficiency.

Batteries 2 and 3

Two different electrolytes were prepared: an electrolyte prepared by dissolving $LiPF_6$ in a solvent mixture of EC and dimethyl carbonate (DMC) at a volume ratio of 1:3 at a $LiPF_6$ concentration of 1 mol/L; and another electrolyte prepared by dissolving $LiPF_6$ in a solvent mixture of PC and DMC at a volume ratio of 1:3 at a $LiPF_6$ concentration of 1 mol/L.

Batteries 2 and 3 were produced in the same manner as the battery 1 was produced except that the above two electrolytes were used. The battery 2 included the electrolyte containing the solvent mixture of PC and DMC. The battery 3 included the electrolyte containing the solvent mixture of EC and DMC.

Comparative Batteries 3 and 4

For comparison, comparative batteries 3 and 4 were produced in the same manner as the battery 1 was produced except that the negative electrode was produced as follows and that the above-prepared two different electrolytes were used. The comparative battery 3 included the electrolyte containing the solvent mixture of PC and DMC (PC:DMC=1:3 (volume ratio)). The comparative battery 4 included the electrolyte containing the solvent mixture of EC and DMC (EC:DMC=1:3 (volume ratio)).

The process for producing the negative electrode used in the comparative batteries 3 and 4 is now described.

SiO particles (available from Shin-Etsu Chemical Co., Ltd.) having an average particle size of 2 μm were coated with carbon by thermal chemical vapor deposition (thermal CVD). The resulting carbon-coated SiO particles were mixed with PVDF as a binder at a weight ratio of 100:9 to prepare a mixture. To the thus-obtained mixture was further added NMP to prepare a negative electrode material mixture paste. This obtained paste was applied onto both surfaces of a current collector copper foil, followed by drying to produce a negative electrode having active material layers formed on both surfaces thereof. Each active material layer had a thickness of 20 μm.

Comparative Batteries 5 and 6

For further comparison, comparative batteries 5 and 6 were produced in the same manner as the battery 1 was produced except that the negative electrode was produced as follows and that the above-prepared two different electrolytes were used. The comparative battery 5 included the electrolyte containing the solvent mixture of PC and DMC (PC:DMC=1:3 (volume ratio)). The comparative battery 6 included the electrolyte containing the solvent mixture of EC and DMC (EC:DMC=1:3 (volume ratio)).

The process for producing the negative electrode used in the comparative batteries 5 and 6 is now described.

An artificial graphite (SFG5 available from Timcal Ltd.) having an average particle size of 5 μm and PVDF as a binder were mixed at a weight ratio of 100:9 to prepare a mixture. To the mixture was further added NMP to prepare a paste. The obtained paste was applied onto both surfaces of a current collector copper foil, followed by drying to form a coating film having a thickness of 20 μm on each surface of the current collector.

Subsequently, the current collector having graphite coating films formed on both surfaces thereof was placed in a vapor deposition apparatus having an EB heater and using single silicon crystals as the targets as shown in FIG. 2. While the current collector having graphite coating films formed thereon was moved at a rate of 30 cm/min, a silicon thin film was formed on the graphite coating film. Conditions used at this time were as follows:

target: single silicon crystal;
accelerating voltage of electron beam irradiated to the single silicon crystal: −8 kV; and
emission of electron beam: 300 mA.

Further, no oxygen was introduced into the vapor deposition equipment.

In the same manner as above, a silicon thin film was formed on the other surface of the current collector. Each silicon thin film had a thickness of 2 μm.

The batteries 2 to 3 and the comparative batteries 3 to 6 were analyzed in terms of initial capacity, charge/discharge efficiency and discharge capacity ratio at −10° C.

The discharge capacity ratio at −10° C. was determined as follows.

Each battery was charged at a constant current of 40 mA until the battery voltage reached 4.2 V in an ambient temperature of 25° C. Thereafter, the ambient temperature was decreased to −10° C. In an environment of −10° C., the battery was discharged at a current of 40 mA until the battery voltage decreased to 2.5 V, during which the discharge capacity was measured. The rate of the obtained discharge capacity to the initial capacity expressed in percentage was denoted as discharge capacity ratio at −10° C.

The results are shown in Table 2.

TABLE 2

| | Solvent composition | Initial capacity (mAh) | Charge/discharge efficiency (%) | Discharge capacity ratio at −10° C. (%) |
|---|---|---|---|---|
| Battery 2 | PC:DMC = 1:3 | 239 | 83 | 86 |
| Battery 3 | EC:DMC = 1:3 | 241 | 82 | 63 |
| Comp. Battery 3 | PC:DMC = 1:3 | 0 (unable to perform discharging) | — | — |
| Comp. Battery 4 | EC:DMC = 1:3 | 205 | 61 | 59 |
| Comp. Battery 5 | PC:DMC = 1:3 | 0 (unable to perform discharging) | — | — |
| Comp. Battery 6 | EC:DMC = 1:3 | 279 | 95 | 60 |

As can be seen from Table 2, in the comparative batteries 3 and 5 having a PC-containing electrolyte, a large amount of gas was generated at the initial charge and therefore discharging could not be performed. This is because a film composed of a decomposition product of PC was not formed on the graphite surface during decomposition of PC on the graphite surface so that PC was kept decomposed.

In the case of the batteries having the EC-containing electrolyte, because a film composed of a decomposition product of EC was formed during decomposition of EC at the initial charge, EC was not decomposed in the subsequent cycles.

Meanwhile, the battery 2 having the PC-containing electrolyte had no problem.

Apparently, in a comparison between the battery 2 having the PC-containing electrolyte and the battery 3 having the EC-containing electrolyte, the battery 2 had higher discharge capacity ratio at −10° C., exhibiting superior low temperature characteristics.

Subsequently, the battery 3 and the comparative batteries 4 and 6 were analyzed in terms of high rate capacity ratio and capacity retention rate in the same manner described above. The results are shown in Table 3.

TABLE 3

| | Solvent composition | High rate capacity rate (%) | Capacity retention rate at the 100th cycle (%) |
|---|---|---|---|
| Battery 3 | EC:DMC = 1:3 | 95 | 88 |
| Comp. Battery 4 | EC:DMC = 1:3 | 80 | 50 |
| Comp. Battery 6 | EC:DMC = 1:3 | 70 | 73 |

As can be seen from Table 3, the comparative batteries 4 and 6 had a lower high rate capacity ratio and a lower capacity retention rate than the battery 3.

The low cycle characteristics of the comparative batteries 4 and 6 are presumably due to the following: in the case of the comparative battery 4, because the particulate active material was used, the binding force between the active material particles as well as the binding force between the current collector and the active material particles decreased by repeated expansion and contraction of the active material; in the case of the comparative battery 6, carbon and silicon were separated from each other at the interface therebetween by repeated charge and discharge.

From the above results, it was found that the negative electrode of the present invention containing no carbon material exhibits superior high rate discharge characteristics and excellent cycle characteristics.

Example 3

In this example, the oxygen ratio in the active material layer was changed by changing the flow rate of oxygen introduced in the vacuum chamber of the vapor deposition equipment shown in FIG. 2.

Batteries 4 and 5

Batteries were produced in the same manner as the battery 1 was produced except that, in the production of the negative electrode, the flow rate of oxygen gas was set at 60 sccm or 100 sccm. The produced batteries were denoted as batteries 4 and 5, respectively.

Battery 6

A battery was produced in the same manner as the battery 1 was produced except that, in the production of the negative electrode, the flow rate of oxygen gas was set at 100 sccm, that the emission of electron beam was set at 450 mA and that the copper foil was moved at a rate of 40 cm/min. The produced battery was denoted as battery 6.

Batteries 7 to 11

Batteries were produced in the same manner as the battery 1 was produced except that, in the production of the negative electrode, the flow rate of oxygen gas was set at 40 sccm, 30 sccm, 130 sccm, 150 sccm or 20 sccm. The produced batteries were denoted as batteries 7 to 11, respectively. Note that, in the batteries 4 to 11 produced here, each active material layer (i.e., the active material layer on one surface of the current collector) had a thickness of 6 μm.

The negative electrodes included in the batteries 4 to 11 were analyzed by Auger electron spectroscopy (AES). Based on the presence ratio of silicon and oxygen, the molar ratio x of oxygen to silicon was calculated. Thereafter, the thickness of an area where the molar ratio x ranged from 0 to 0.8, that of an area where the molar ratio x ranged from 1.2 to 2.0, and that of an area where the molar ratio x ranged from 0.8 to 2.0. The results are shown in Table 4.

The batteries 4 to 11 were further analyzed in terms of initial capacity, charge/discharge efficiency, high rate capacity ratio and capacity retention rate at the 100th cycle in the same manner described previously. The results are shown in Table 5.

TABLE 4

| x value of $SiO_x$ | Thickness of area of $0 \leq x \leq 0.8$ (μm) | Thickness of area of $1.2 \leq x \leq 2.0$ (μm) | Thickness of area of $0.8 \leq x \leq 2.0$ (μm) | x value at a depth of 50 nm | x value at a depth of 5.9 μm |
|---|---|---|---|---|---|
| Battery 4 | 2.0 | 0.6 | 4.0 | 0.1 | 1.5 |
| Battery 5 | 0.6 | 2.0 | 5.4 | 0.6 | 1.9 |
| Battery 6 | 0.6 | 0.6 | 5.4 | 0.6 | 1.5 |
| Battery 7 | 2.5 | 0.0 | 3.5 | 0.1 | 1.3 |
| Battery 8 | 5.4 | 0.0 | 0.6 | 0.1 | 0.9 |
| Battery 9 | 0.0 | 2.8 | 6.0 | 0.7 | 1.9 |
| Battery 10 | 0.0 | 4.2 | 6.0 | 1.2 | 1.9 |
| Battery 11 | 6.0 | 0.0 | 0.0 | 0.1 | 0.6 |

TABLE 5

| | Initial capacity (mAh) | Charge/discharge efficiency (%) | High rate capacity rate (%) | Capacity retention rate at the 100th cycle (%) |
|---|---|---|---|---|
| Battery 4 | 255 | 86 | 85 | 81 |
| Battery 5 | 199 | 74 | 95 | 95 |
| Battery 6 | 221 | 80 | 94 | 95 |
| Battery 7 | 253 | 86 | 82 | 81 |
| Battery 8 | 258 | 87 | 76 | 80 |
| Battery 9 | 124 | 52 | 94 | 97 |
| Battery 10 | 112 | 43 | 93 | 98 |
| Battery 11 | 260 | 88 | 70 | 70 |

The results of the batteries 5, 9 and 10 show that when the batteries had thick areas having a higher molar ratio x of oxygen, an improved high rate capacity ratio and excellent cycle characteristics were obtained. However, the initial capacity and the charge/discharge efficiency were lower.

The results of the batteries 4, 5, 6, 7 and 8 indicate that an area of the active material layer near the negative electrode surface, in which the molar ratio x of oxygen to silicon of $SiO_x$ is $0 \leq x \leq 0.8$, preferably has a thickness T2 of not less than T/10 (0.6 μm), and that an area of the active material layer near the interface between the active material layer and the current collector, in which the molar ratio x of oxygen to silicon of $SiO_x$ is $0.8 \leq x \leq 2.0$, preferably has a thickness T1 of not less than T/10 (0.6 nm). Accordingly, setting the thicknesses T1 and T2 in the above range can provide batteries having an excellent balance of initial capacity, high rate discharge capacity and cycle characteristic.

In the battery 11 in which the x value was small and the area of $0.8 < x < 1.2$ had a thickness of less than T/10, the high rate discharge capacity ratio was low because the oxygen ratio was low. The capacity retention rate was also low because, when the oxygen ratio was small, the expansion coefficient of the active material was large.

Example 4

In this example, using the vapor deposition apparatus shown in FIG. 2, the thickness of the active material layer was changed by changing the moving speed of the current collector.

Battery 12

A battery was produced in the same manner as the battery 1 was produced except that, in the production of the negative electrode, an active material layer having a thickness of 0.5 μm was formed on each surface of the current collector by moving the current collector copper foil at a rate of 3 m/min, and that the positive electrode had a thickness ⅛ times that of the battery 1. The produced battery was denoted as battery 12.

Battery 13

A battery was produced in the same manner as the battery 1 was produced except that, in the production of the negative electrode, an active material layer having a thickness of 20 μm was formed on each surface of the current collector by moving the current collector at a rate of 9 cm/min. The produced battery was denoted as battery 13.

Battery 14

A battery was produced in the same manner as the battery 1 was produced except that, in the production of the negative electrode, an active material layer having a thickness of 30 μm was formed on each surface of the current collector by moving the current collector at a rate of 6 cm/min. The produced battery was denoted as battery 14.

Battery 15

A battery was produced in the same manner as the battery 1 was produced except that, in the production of the negative electrode, an active material layer having a thickness of 37 μm was formed on each surface of the current collector by moving the current collector at a rate of 5 cm/min. The produced battery was denoted as battery 15.

The produced batteries 12 to 15 were analyzed in terms of initial capacity, charge/discharge efficiency, high rate capacity ratio and capacity retention rate at the 100th cycle. The results are shown in Table 6.

TABLE 6

| | Thickness of negative electrode active material layer (μm) | Initial capacity (mAh) | Charge/discharge efficiency (%) | High rate capacity rate (%) | Capacity retention rate at the 100th cycle (%) |
|---|---|---|---|---|---|
| Battery 12 | 0.5 | 99 | 85 | 97 | 98 |
| Battery 13 | 20 | 203 | 80 | 82 | 91 |

TABLE 6-continued

|  | Thickness of negative electrode active material layer (μm) | Initial capacity (mAh) | Charge/discharge efficiency (%) | High rate capacity rate (%) | Capacity retention rate at the 100th cycle (%) |
|---|---|---|---|---|---|
| Battery 14 | 30 | 179 | 71 | 78 | 85 |
| Battery 15 | 37 | 151 | 60 | 65 | 68 |

The results shown in Table 6 indicate that the thickness of the active material layer on each surface of the current collector is preferably not greater than 30 μm, more preferably not greater than 20 μm, in order to obtain a high rate charge/discharge capacity of not less than 78%.

If the current collector is moved at a rate of not less than 3 m/min, it would be possible to form a thin negative electrode active material layer having a thickness of less than 0.5 μm. However, if the thickness of the negative electrode active material layer is small, the positive electrode to be positioned opposite to the negative electrode needs to have a small thickness, which is difficult to produce by the production method of positive electrode described previously. Moreover, the battery capacity would also decrease significantly, losing an advantage of high capacity offered by the use of silicon. Note that, in the case of producing a thin battery, it is advantageous to use a negative electrode having a thin active material layer.

The battery 12 whose active material layer had a thickness of 0.5 μm had a low capacity, but the high rate capacity ratio was extremely high, indicating that it is suitable for applications that require high power output. In this example, the current collectors having a thickness of 35 μm were used. Therefore, in the case of the battery 12 in which the active material layer on each surface of the current collector had a thickness of 0.5 μm, the thickness of the current collector was much larger than that of the active material layer. For this reason, the volume of the active material layer to be inserted into the battery case was decreased, resulting in a low capacity.

Example 5

This example investigated the conditions for improving the formation speed of the active material layer.
(Production Method 1)
Using the vapor deposition equipment shown in FIG. 2 in which the can roller 13a was heated to 300° C., a negative electrode was produced by forming an active material layer on each surface of the current collector under the following conditions:
  targets 15a and 15b: single silicon crystal;
  flow rate of oxygen: 100 sccm;
  accelerating voltage of electron beam irradiated to the target: −8 kV;
  emission of electron beam: 500 mA; and
  moving speed of the current collector: 1 m/min.
Using the above-produced negative electrode, a battery was produced in the same manner as the battery 1 was produced. The produced battery was denoted as battery 16.
(Production Method 2)
A battery was produced in the same manner as Production Method 1 except that, in the production of the negative electrode, the can roller 13a was heated to 800° C. The produced battery was denoted as battery 17.
(Production Method 3)
A battery was produced in the same manner as Production Method 1 except that, in the production of the negative electrode, the can roller 13a was heated to 900° C. The produced battery was denoted as battery 18.
(Production Method 4)
Using the vapor deposition equipment shown in FIG. 2 in which the target 15a was silicon dioxide and the target 15b was silicon, an active material layer was formed on a surface of the current collector under the following conditions such that a film composed of silicon dioxide was mainly formed at the beginning of vapor deposition, gradually increasing the ratio of silicon in the thickness direction of the active material layer, and then a film composed of only silicon was formed at the end of vapor deposition.
  Accelerating voltage of electron beam irradiated to the targets: −8 kV.
  Emission of electron beam: 400 mA.
  Moving speed of the current collector: 1 m/min.
Thereby, an active material layer in which the ratio of oxygen was increased in the thickness direction of the active material layer (i.e., from the side not in contact with the current collector towards the side in contact with the current collector) was formed. The above-described operation was also applied to the other surface of the current collector to produce a negative electrode. Using the thus-obtained negative electrode, a battery was produced in the same manner as the battery 1 was produced. The produced battery was denoted as battery 19.

The batteries 16 to 19 were analyzed in terms of initial capacity, charge/discharge efficiency, high rate capacity ratio and capacity retention rate at the 100th cycle. The results are shown in Table 7.

TABLE 7

|  | Initial capacity (mAh) | Charge/discharge efficiency (%) | High rate capacity rate (%) | Capacity retention rate at the 100th cycle (%) |
|---|---|---|---|---|
| Battery 16 | 240 | 85 | 92 | 90 |
| Battery 17 | 180 | 85 | 90 | 90 |
| Battery 18 | 70 | 90 | 90 | 90 |
| Battery 19 | 240 | 90 | 80 | 85 |

Comparisons between the batteries of 16 to 19 and the battery 1 show that they yielded almost similar results except initial capacity. In summary, even when the current collector was moved at a rate of 1 m/min, the oxidation reaction of silicon was facilitated by increasing the flow rate of oxygen and the emission of electron beam, and heating the can roller, resulting in an improved production speed of the active material layer.

However, the battery 18 produced using the can roller heated to 900° C. exhibited a significantly decreased initial capacity. The AES result of the active material layer revealed that the copper constituting the current collector diffused in silicon. It is surmised that the silicon and copper formed an alloy and therefore became inactive to lithium. Accordingly, the temperature of the can roller is preferably not greater than 800° C.

The result of the battery 19 indicates that it is also effective to use two different targets such as silicon and a silicon oxide (e.g., silicon dioxide).

Example 6

For producing negative electrodes, this example employed the sputtering equipment including a sputtering apparatus (available from ULVAC, Inc.), a feeding roller, can rollers and a winding roller shown in FIG. 3.

Also, negative electrodes were produced essentially as described previously.

Battery 20

As the current collector, an electrolytic copper foil (available from Furukawa Circuit Foil Co., Ltd.) having a width of 10 cm, a thickness of 35 μm and a length of 50 m was used. This copper foil was fed, at a rate of 1 cm/min, from the feeding roller 12 through the can rollers 13a and 13b to the winding roller 14 having an empty reel where the copper foil was wound.

The sputtering gas used here was argon gas having a purity of 99.999% (available from Nippon Sanso Corporation). The flow rate of argon gas was set at 100 sccm.

As the targets 21a and 21b, single silicon crystals having a purity of 99.9999% (available from Shin-Etsu Chemical Co., Ltd.) were used.

The output of a high frequency power source (not shown in the drawing) used for sputtering of the targets was set at 2 kW.

The pressure in a vacuum chamber (not shown in the drawing) was set at 1 Torr.

As the oxygen atmosphere, oxygen gas having a purity of 99.7% (available from Nippon Sanso Corporation) was used. The flow rate of the oxygen gas ejected from the oxygen nozzle 16 was set at 10 sccm. The oxygen nozzle 16 was connected to a pipe inserted in the vacuum chamber (not shown in the drawing) which connected to an oxygen bomb through a mass flow controller. Similar to EXAMPLE 1, the can rollers 13a and 13b had a temperature of 20° C.

Under the conditions given above, an active material layer containing silicon and oxygen was formed on each surface of the current collector. Each active material layer had a thickness of 6.0 μm.

The ratio between Si and O in the thickness direction of the active material layer was determined by Auger electron spectroscopy (AES). As a result, the oxygen distribution was almost similar to that of the negative electrode active material layer of the battery 1.

Using the negative electrode described above, a battery was produced in the same manner as the battery 1 was produced. The obtained battery was denoted as battery 20.

Battery 21

A battery was produced in the same manner as the battery 1 was produced except that an electrolytic copper foil (available from Furukawa Circuit Foil Co., Ltd.) having a width of 10 cm, a thickness of 35 μm, a length of 50 m and a surface roughness Ra of 1 μm was used as the current collector. The produced battery was denoted as battery 21.

The batteries 20 and 21 were analyzed in terms of initial capacity, charge/discharge efficiency, high rate capacity ratio and capacity retention rate at the 100th cycle. The results are shown in Table 8.

TABLE 8

|  | Initial capacity (mAh) | Charge/discharge efficiency (%) | High rate capacity rate (%) | Capacity retention rate at the 100th cycle (%) |
| --- | --- | --- | --- | --- |
| Battery 20 | 245 | 80 | 95 | 92 |
| Battery 21 | 240 | 80 | 95 | 98 |

Comparisons of characteristics between the batteries 20 to 21 and the battery 1 show that it is possible to produce negative electrodes having similar performance regardless of using vapor deposition equipment or sputtering equipment.

The battery 21 having the current collector copper foil with a roughened surface exhibited an improved capacity retention rate or improved cycle characteristics. This indicates that, although satisfactory cycle characteristics can be obtained when the current collector copper foil has a flat surface as evidenced by the battery 20, even when the current collector copper foil has a roughened surface like the battery 21, a negative electrode having excellent performance can be obtained.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A negative electrode for a lithium ion secondary battery comprising a current collector and an active material layer carried on said current collector, wherein said active material layer comprises silicon, oxygen and no binder and wherein said active material layer has a larger oxygen ratio on a side which is in contact with said current collector than on a side which is not in contact with said current collector, wherein said oxygen ratio is continuously increased in a thickness direction of said active material layer from the side which is not in contact with said current collector than the side which is in contact with said current collector.

2. The negative electrode for a lithium ion secondary battery in accordance with claim 1,
wherein, when said active material layer contains an active material represented by $SiO_x$ ($0 \leq x \leq 2$) and has a thickness of T, an area in said active material layer comprising $SiO_x$ ($0.8 \leq x \leq 2$) has a thickness T1 of not less than T/10.

3. The negative electrode for a lithium ion secondary battery in accordance with claim 1,
wherein, when said active material layer contains an active material represented by $SiO_x$ ($0 \leq x \leq 2$) and has a thickness of T, an area in said active material layer comprising $SiO_x$ ($0 \leq x \leq 0.8$) has a thickness T2 of not less than T/10.

4. The negative electrode for a lithium ion secondary battery in accordance with claim 1,
wherein the thickness T of said active material layer is 0.5 μm $\leq$ T $\leq$ 30 μm.

5. The negative electrode for a lithium ion secondary battery in accordance with claim 1,
wherein an active material contained in said active material layer comprises silicon and a silicon oxide, and
wherein said silicon and said silicon oxide are amorphous and exhibit a broad peak at 10° to 40° in an X-ray diffraction pattern using Cukα radiation as a light source.

6. A lithium ion secondary battery comprising a positive electrode, the negative electrode in accordance with claim 1, a separator disposed between said positive electrode and said negative electrode and an electrolyte.

\* \* \* \* \*